United States Patent [19]
Oliver

[11] Patent Number: 6,086,029
[45] Date of Patent: Jul. 11, 2000

[54] SUPPORT SYSTEM FOR WOOD FRAMED CONSTRUCTION

[75] Inventor: John F. Oliver, Dagsboro, Del.

[73] Assignee: Oliver Systems International, Inc., Dagsboro, Del.

[21] Appl. No.: 09/159,000

[22] Filed: Sep. 23, 1998

Related U.S. Application Data

[63] Continuation-in-part of application No. 08/917,165, Aug. 25, 1997, abandoned.

[51] Int. Cl.[7] .................................................. E04G 25/00
[52] U.S. Cl. ........................... 248/200.1; 248/56; 248/58; 248/62
[58] Field of Search ................................ 248/56, 58, 60, 248/62, 65, 68.1, 74.1, 200.1, 220.1, 323, 343

[56] References Cited

U.S. PATENT DOCUMENTS

| | | | |
|---|---|---|---|
| 1,793,036 | 2/1931 | Whitney | 248/200.1 X |
| 1,927,515 | 9/1933 | Eastman | 248/343 |
| 2,247,024 | 6/1941 | Hurley | 248/200.1 X |
| 2,560,845 | 7/1951 | Carpenter et al. | 248/58 |
| 3,425,655 | 2/1969 | Cogdill | 248/544 X |
| 3,576,305 | 4/1971 | Welsh | 248/62 X |
| 3,892,378 | 7/1975 | Lane | 248/200.1 X |
| 4,254,930 | 3/1981 | Warren | 248/58 X |
| 5,243,153 | 9/1993 | Holwerda | 248/56 X |
| 5,435,514 | 7/1995 | Kerr, Jr. | 248/343 |
| 5,588,737 | 12/1996 | Kusmer | 248/343 X |
| 5,593,115 | 1/1997 | Lewis | 248/200.1 X |

Primary Examiner—Ramon O Ramirez
Assistant Examiner—Gwendolyn Baxter
Attorney, Agent, or Firm—Connolly Bove Lodge & Hutz, LLP

[57] ABSTRACT

A support system for building construction includes a number of sheet metal components or brackets which provide the option of being secured to wooden framework in a nail-less and tool-less manner. One of the components is a main support bracket having pointed ends on each part of the two telescopic members so that the ends can be pressed into the wooden framework. The bracket is channel shaped to provide walls on which other support components may be attached.

27 Claims, 9 Drawing Sheets

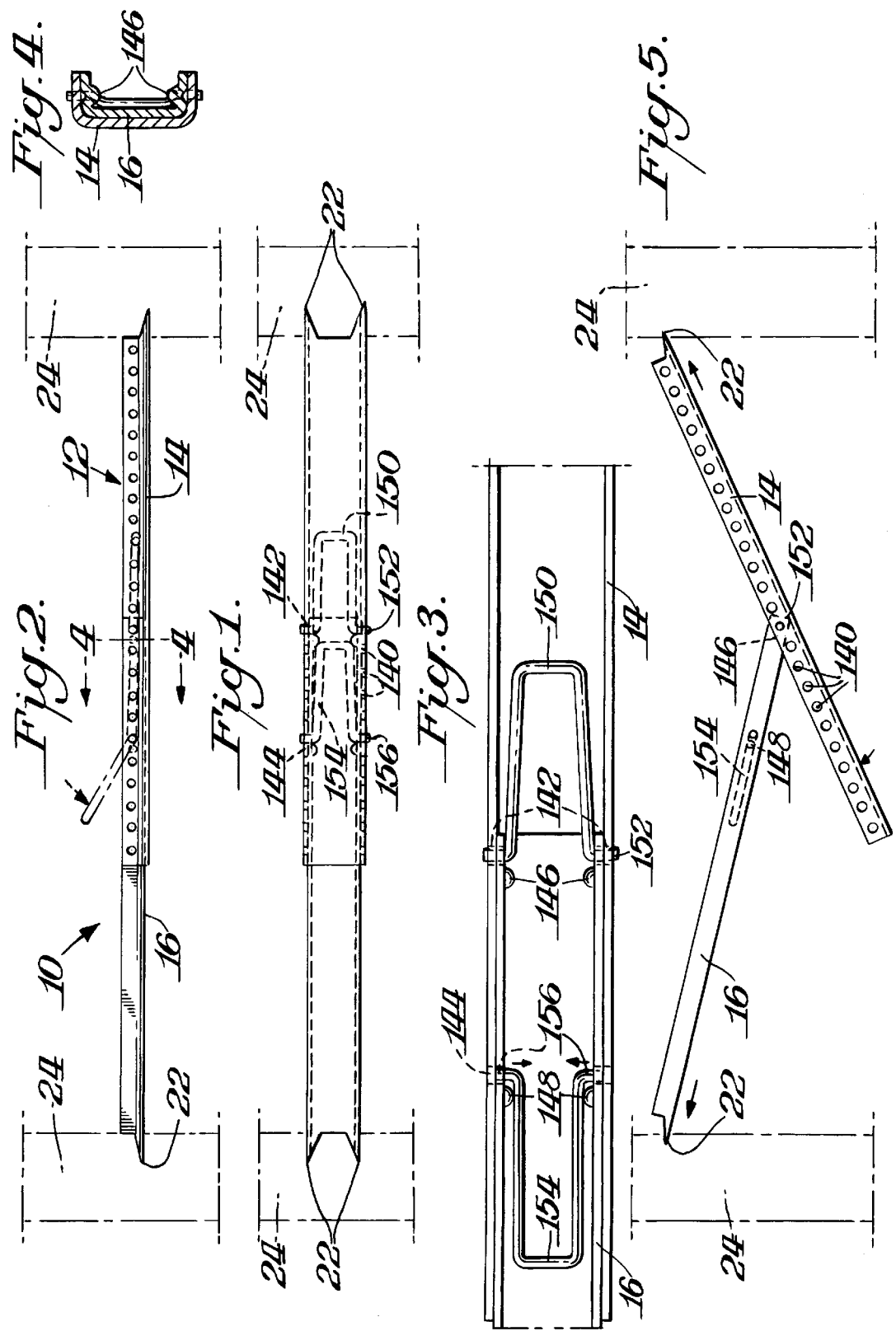

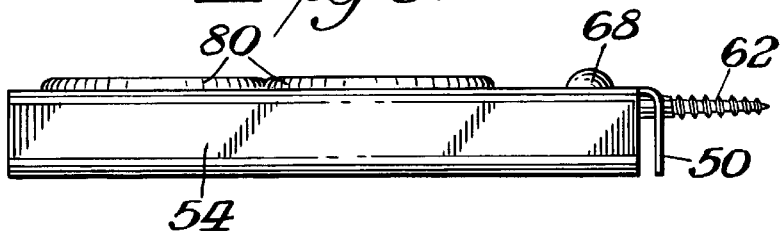
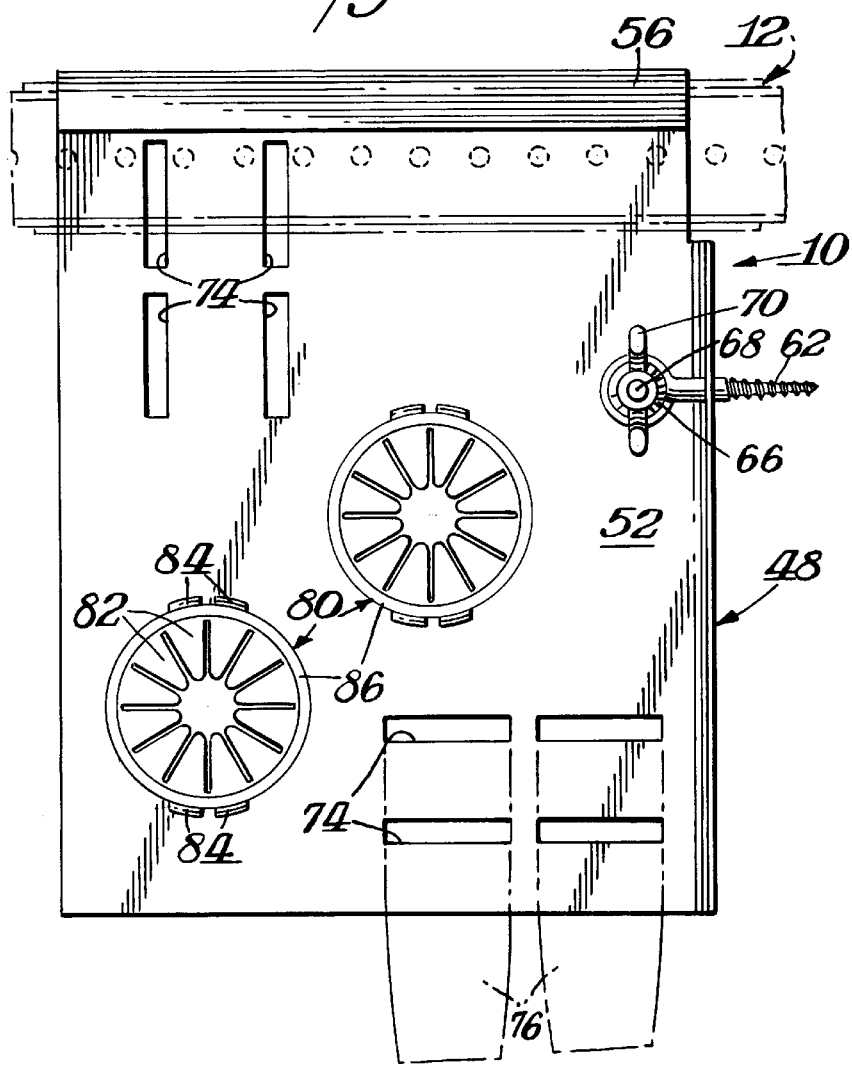
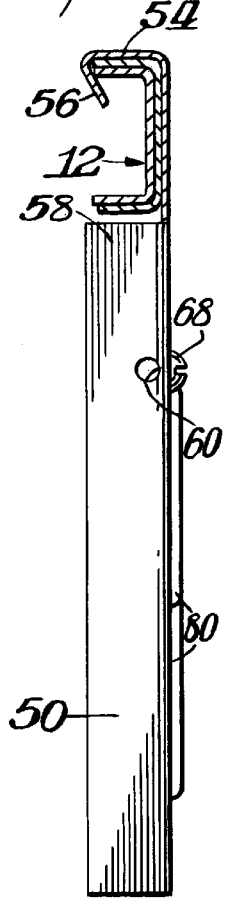

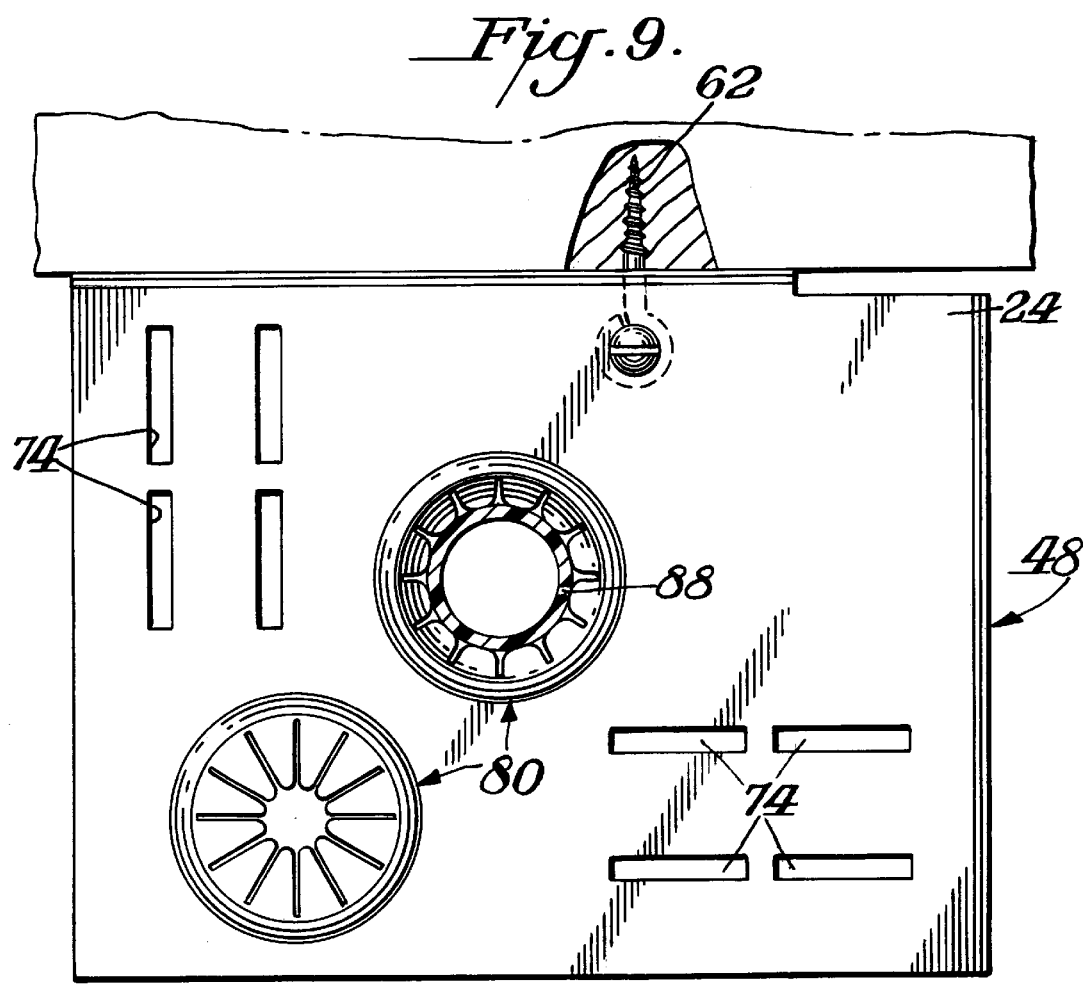

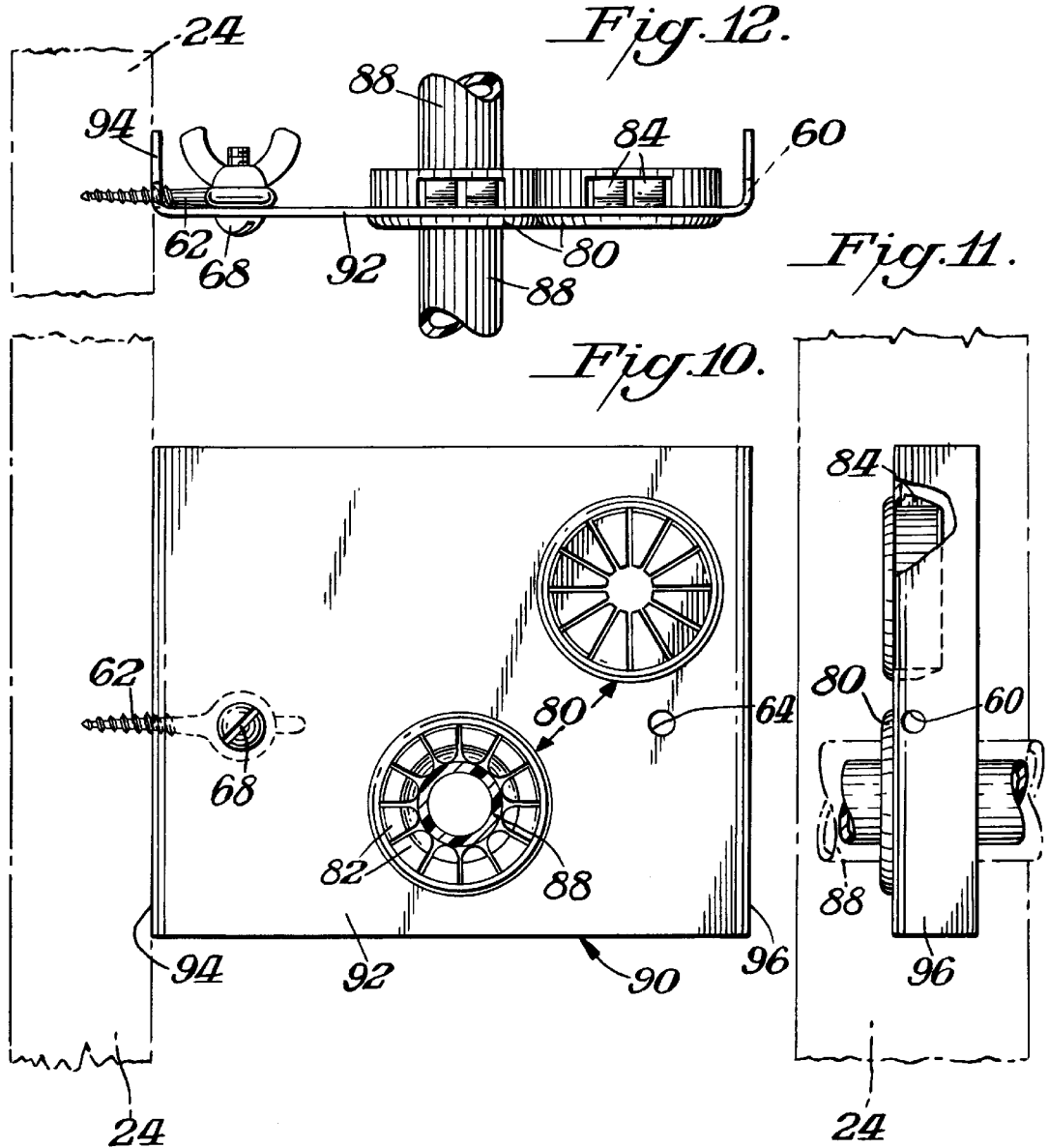

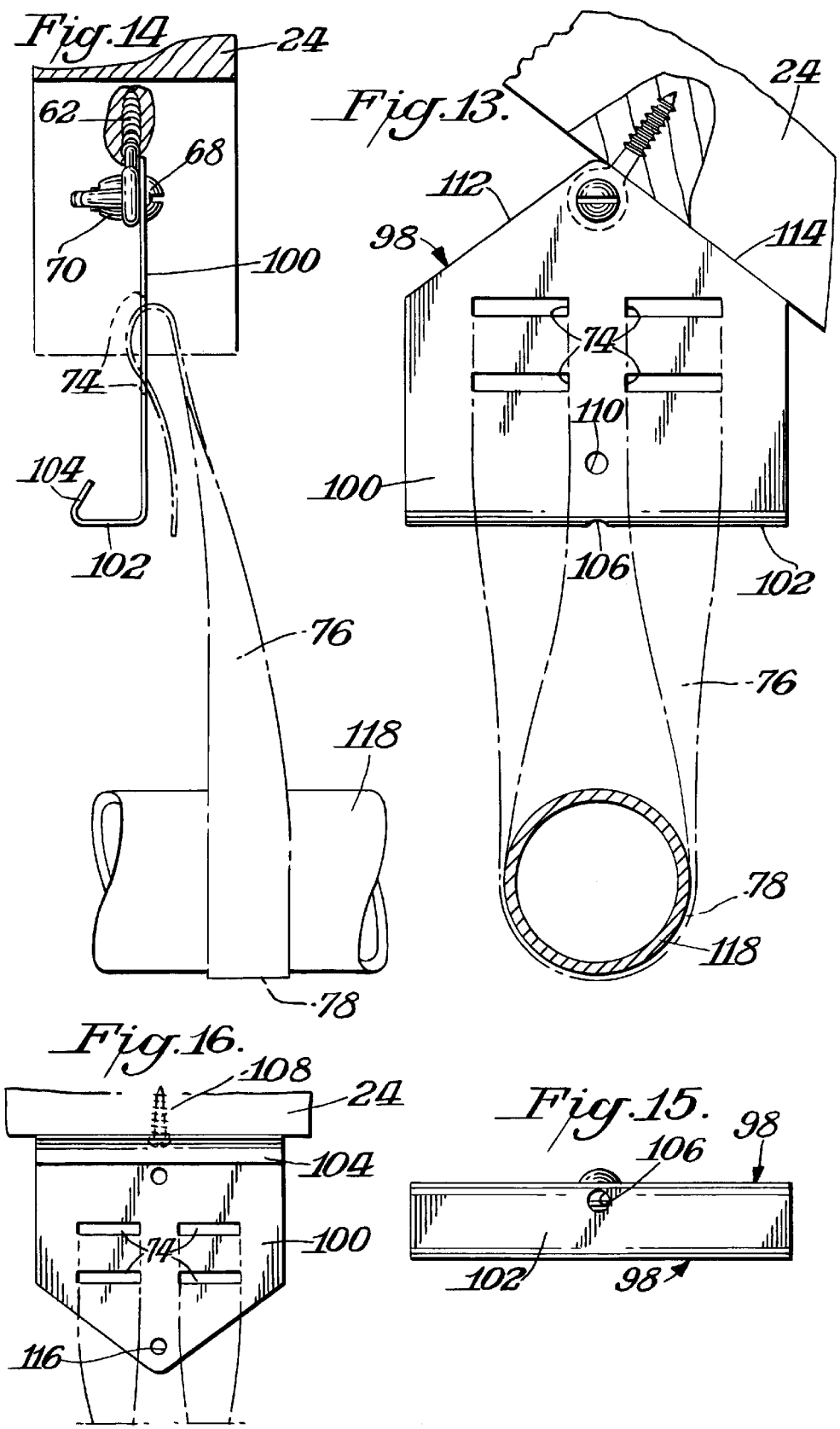

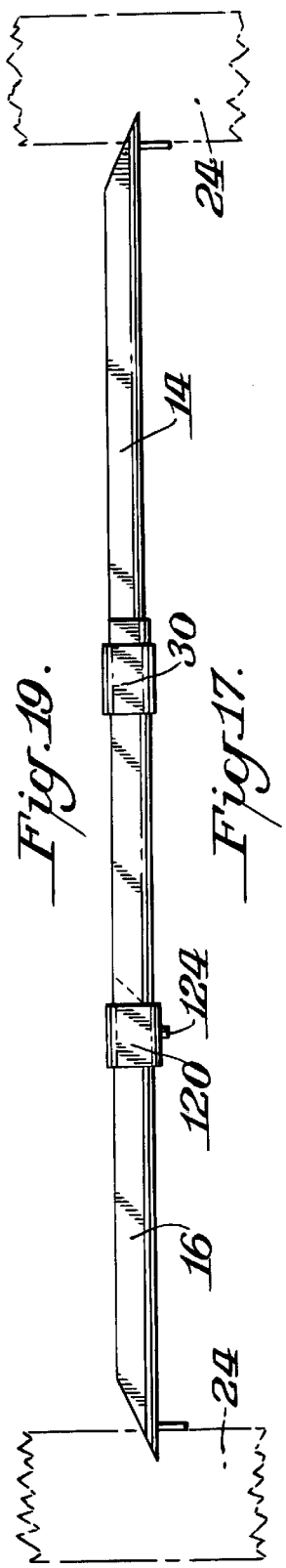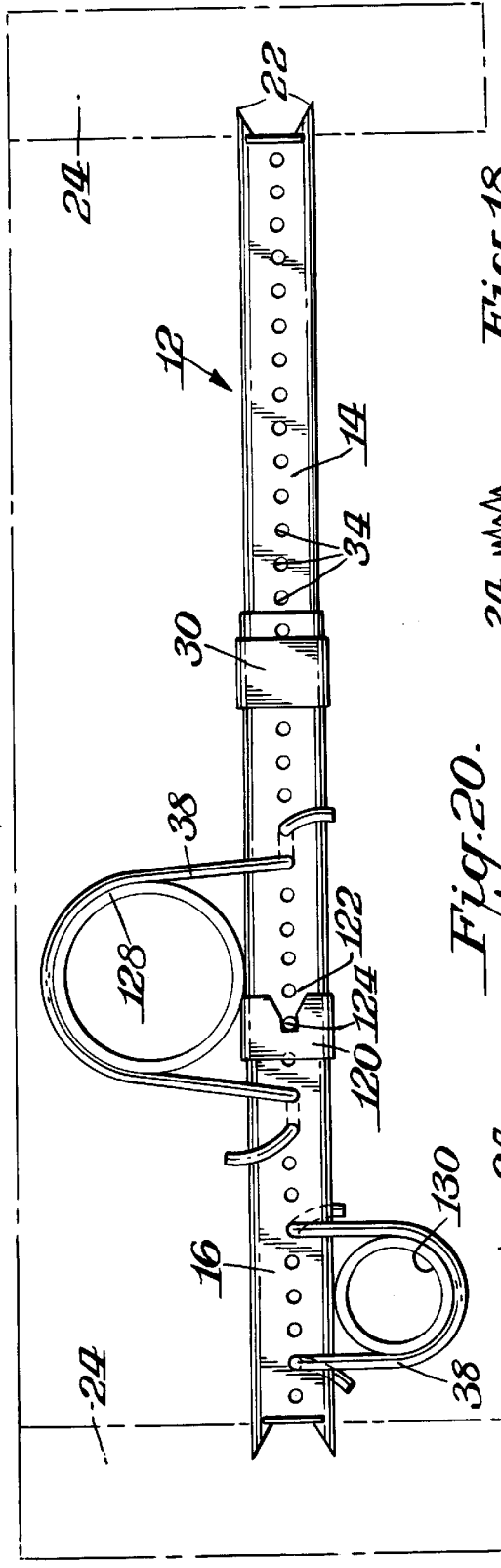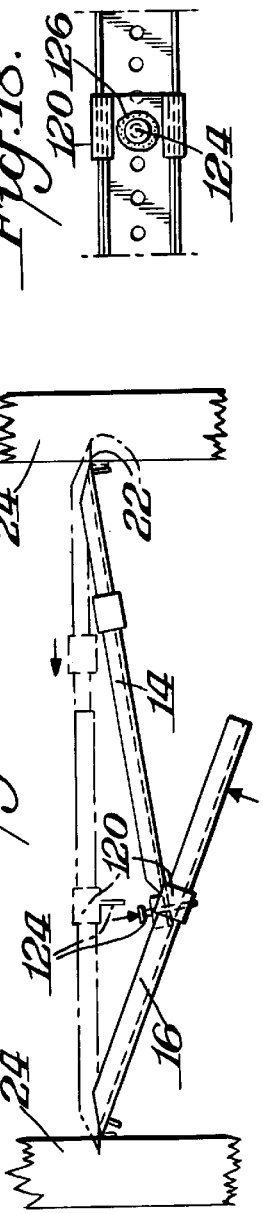

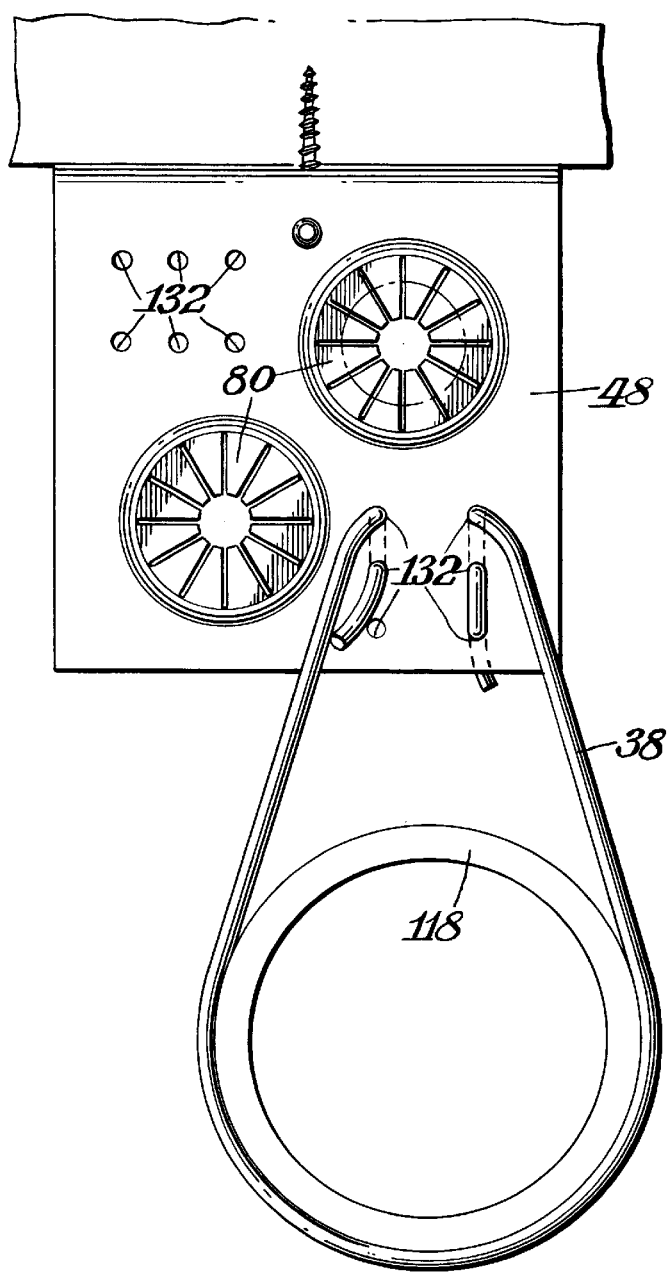

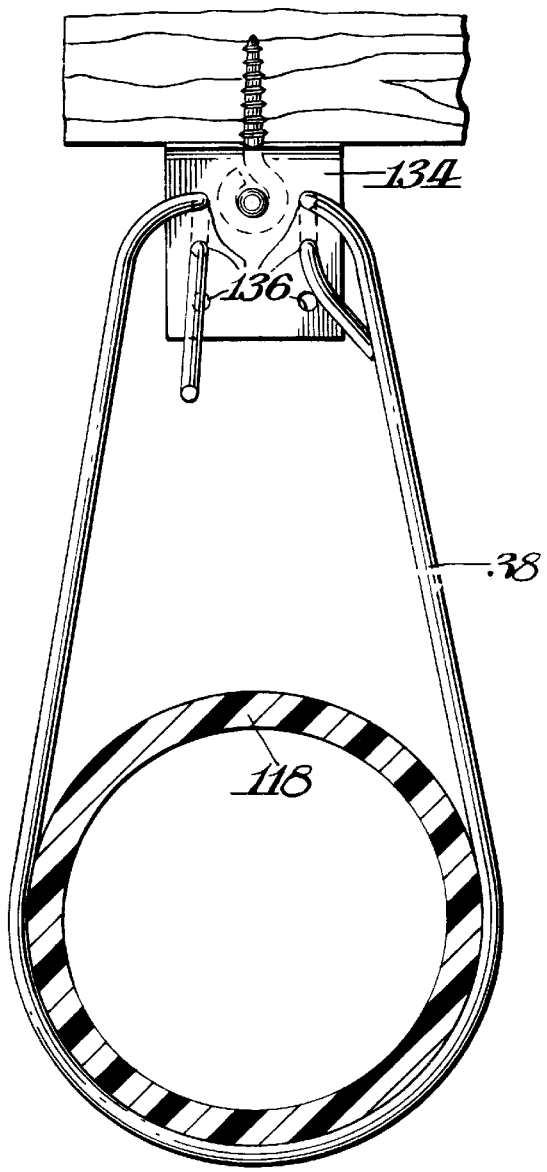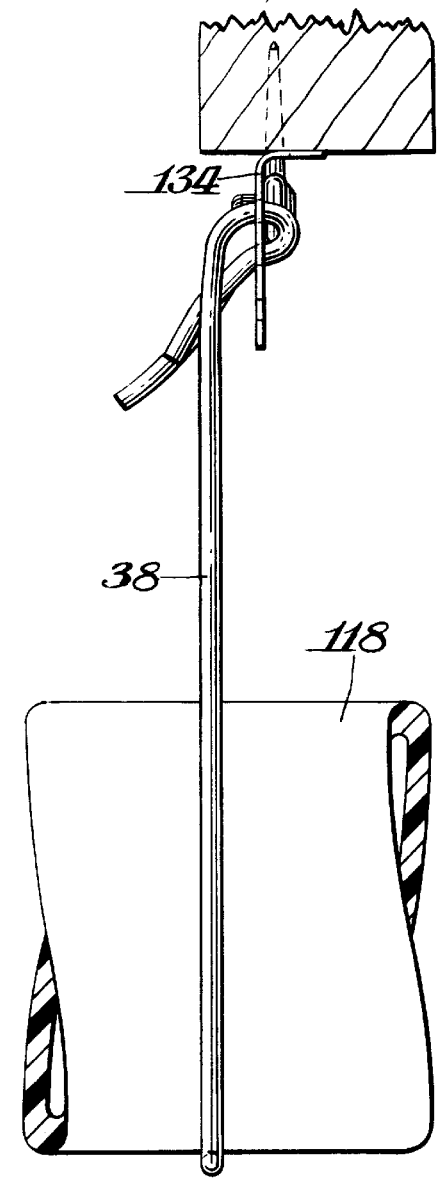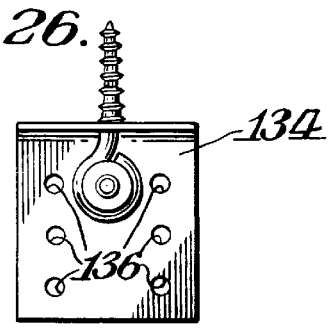

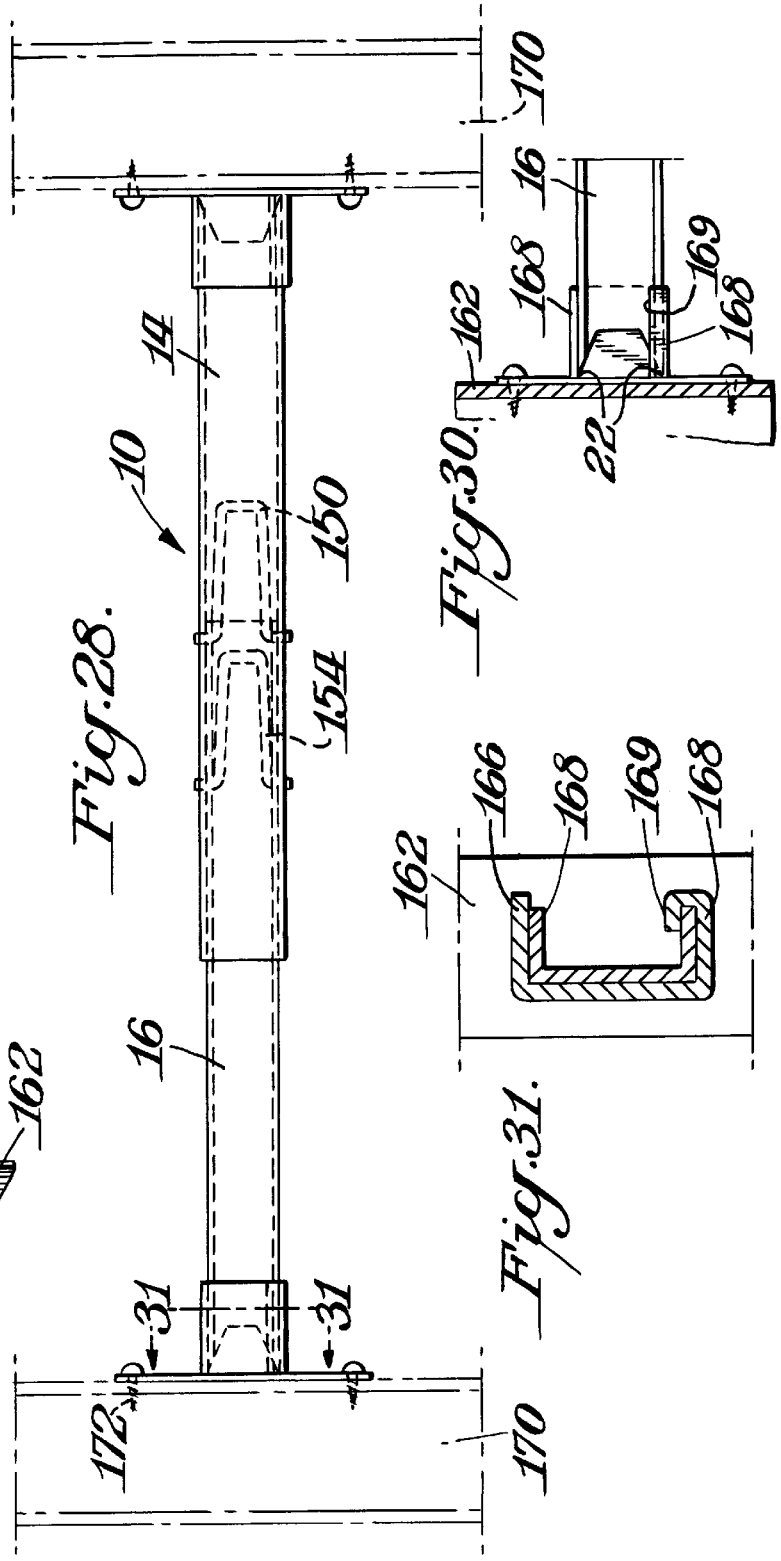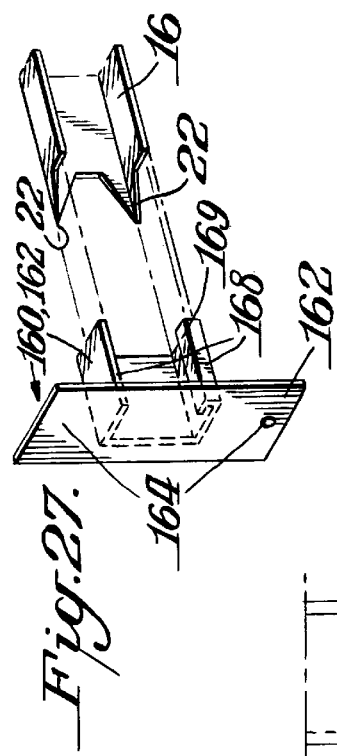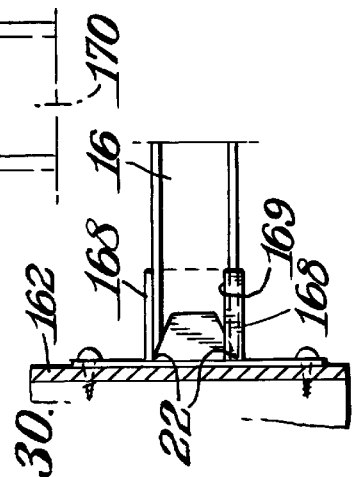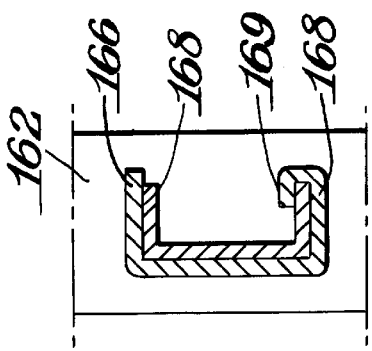

SUPPORT SYSTEM FOR WOOD FRAMED CONSTRUCTION

CROSS-REFERENCE TO RELATED APPLICATION

This application is a continuation in part of application Ser. No. 08/917,165, filed Aug. 25, 1997, now abandoned.

BACKGROUND OF THE INVENTION

In building construction having wood framework such as studs, beams, etc. it is necessary to install various systems such as pipe systems, water, gas, plumbing appurtences and other devices. Generally various brackets are used which are nailed or otherwise fastened to the wooden framework. These conventional installation systems are disadvantageous in requiring additional components, such as tools, nails, etc. and in the effort and difficulty required for mounting the support members.

SUMMARY OF THE INVENTION

An object of this invention is to provide a support system for wood framed construction which is capable of being secured to the wooden structural members in a nail-less and tool-less manner.

A further object of this invention is to provide such a system which functions as support members for pipe systems, water systems, gas systems and other devices.

In accordance with this invention the support system includes as its main component a sheet metal support bracket made of two telescopic members having a channel shape so that the length of the two assembled members can be varied. The channel shape results in exposed walls that would cooperate for mounting other components. The free end of each member is pointed. Thus in assembly the members could be telescoped to a small enough length so that there is clearance between two opposing wood frame pieces such as joists or studs and then when the telescoped members are positioned between a pair of such wood frame members, the telescopic members could be moved apart to penetrate and become fastened into the wood frame by means of the pointed ends.

A second component is a suspended bracket having an inturned lip for engagement over a wall of the main support bracket. The suspended bracket may include sets of slots through which a strap could be inserted and the strap could be used for supporting such devices as pipes or the like. The suspended bracket might also include at least one known type of bushing having resilient flexible fingers through which pipes or other installation components may be mounted. Other forms of suspended brackets may also be used.

THE DRAWINGS

FIG. 1 is a side elevational view showing the main support bracket of they support system in accordance with this invention;

FIG. 2 is a top plan view partially broken away of the main support bracket shown in FIG. 1;

FIG. 3 is a fragmental side elevational view of the bracket shown in FIGS. 1–2;

FIG. 4 is a cross-sectional view taken through FIG. 2 along the line 4–5;

FIG. 5 is a top plan view of the bracket shown in FIGS. 1–4 during a stage of mounting;

FIG. 6 is a rear elevational view of a suspended bracket mounted to the main support bracket in accordance with this invention;

FIG. 7 is an end elevational view partly in section of the assembly shown FIG. 6;

FIG. 8 is a top plan view of the suspended bracket shown in FIGS. 6–7,

FIG. 9 is a front elevational view showing an alternative manner of mount e suspended bracket of FIGS. 6–8;

FIG. 10 is a front elevational view showing a variation of the suspended bracket shown in FIGS. 6–8;

FIG. 11 is a right side elevational view partly broken away of the bracket shown in FIG. 10;

FIG. 12 is a top plan view of the bracket shown in FIGS. 10–11;

FIG. 13 is a front elevational view of still another form of suspended bracket in accordance with this invention mounted to a roof rafter;

FIG. 14 is a left side elevational view of the bracket shown in FIG. 13;

FIG. 15 is a bottom plan view of the bracket shown in FIGS. 13–14;

FIG. 16 is a rear elevational view on a reduced scale of the bracket shown in FIG. 13–15 mounted to a joist;

FIG. 17 is a side elevational view of an alternative main support bracket in accordance with this invention;

FIG. 18 is a fragmental rear elevational view of the bracket shown in FIG. 17;

FIG. 19 is a top plan view of the bracket shown in FIG. 17;

FIG. 20 is a top plan view showing a step in the installation of the bracket of FIG. 17;

FIG. 21 is a front elevational view of a modified form of suspended bracket in accordance with this invention;

FIG. 22 is a top plan view of the bracket shown in FIG. 21;

FIG. 23 is a side elevational view of the bracket shown in FIGS. 21–22;

FIG. 24 is a front elevational view of yet another form of suspended bracket accordance with this invention;

FIG. 25 is a right side elevational view of the bracket shown in FIG. 24;

FIG. 26 is a rear elevational view of the bracket shown in FIGS. 24–25;

FIG. 27 is an exploded perspective view of a modified form of bracket in accordance with a further embodiment of this invention;

FIG. 28 is a front elevational view of the bracket shown in FIG. 27;

FIG. 29 is a fragmental top plan view of the bracket shown in FIGS. 27–28;

FIG. 30 is a fragmental rear elevational view of the bracket shown in FIGS. 27–29; and FIG. 31 is a cross-sectional view taken through FIG. 28 along the line 31—31.

DETAILED DESCRIPTION

The present invention involves a number of components or brackets which are intended to be installed into a wooden framed construction wherein the support members such as floor joists, ceiling beams, studs, rafters, etc. are made of wood and in which the individual brackets are easily mounted to these wooden support frame members. The other components may be attached or suspended from the main support bracket or may be individually mounted. Parent application Ser. No. 08/917,165 discloses various practices of this invention. All of the details of that application are incorporated herein by reference thereto.

Preferably the support brackets used in the support system of this invention are made of sheet metal in order to reduce costs and to facilitate the ease of manufacture. FIGS. 1–5 show the support system 10. As shown therein the bracket 12 includes an outer member 14 and an inner member 16 which are channel shaped and are telescopically mounted. The side walls of outer member 14 include a plurality of adjustment holes 140. The side walls of inner member 16 include 2 sets of holes, 142,144, which are alignable with sets of holes 140. The outer ends of each member 14, 16 terminate in pointed corners 22 for digging into, for example, the wooden joists 24. As shown, for example, in FIGS. 1 and 3, a dimple or projection 146 is located on the inner wall of inner member 16 adjacent to the set of holes 142 while a similar set of dimples 148 is located on the inner wall adjacent to holes 144. A pivot clip 150 is provided in the form of a generally U-shaped spring having outwardly extending ends 152 for selective engagement in the pivot holes 142 of inner member 16 and a selective pair of adjustment holes 140 in outer member 14. The particular set of these adjustment holes 140 would be selected in accordance with the distance between the joists 24,24. Thus, this particular set of adjustment holes in outer member 14 would be selected in accordance with the desired final length of the bracket 12. When the pivot clip arms pass between dimples 146, pivot clip ends 152 move toward each other and disengage ends 152 from holes 140 of outer member 14. Rotating pivot clip 150 approximately 180 degrees whereby the dimples 146 no longer urge the spring arms toward each other, thus the pivot clip ends 152 penetrate the desired corresponding adjustment hole 140 in outer member 14.

A locking clip 154 is provided to maintain alignment of bracket members 14,16. Similar to pivot clip 50, locking clip 154 is in the form of a generally U-shaped spring having outwardly extending ends 156. When the locking clip arms pass between dimples 148, locking clip ends 156 move toward each other and disengage ends 156 from holes 140 of outer member 14. When locking clip 154 is rotated approximately 180 degrees, the dimples 148 no longer urge the spring arms toward each other. Thus the locking clip ends 156 penetrate the corresponding holes 140 in outer bracket 14, causing bracket members 14,16 to become rigidly aligned.

Initially, complete disengagement of members 14,16 is desired. Pivot clip 150 and locking clip 154 are rotated so that their spring arms pass between dimples 146,148 respectively, thereby causing the spring arms of pivot clip 150 and locking clip 154 to move toward each and disengage the pivot clip ends 152,152 from holes 140 of outer member 14 and locking clip ends 156,156 from holes 140 of outer member 14 thereby completely disengaging outer member 14 from inner member 16.

When final desired length of bracket 12 is established, pivot clip 150 is rotated approximately 180 degrees. Pivot clip arms move away from dimples 146, extending pivot clip ends 152,152 to engage in set of corresponding adjustment holes 140 of outer member 14, thus allowing the two bracket members 14,16 to be positioned into the generally V-shape shown in FIG. 5 for making initial penetration of the pointed corners 22 into wood structural members 24. By pushing upward on the outer free end of outer member 14 as indicated by arrow in FIG. 5, the two bracket members 14,16 are moved into alignment with each other and the pointed corners 22,22 dig deeply into wood structural members 24,24. In order to maintain bracket member halves 14,16 in alignment, locking clip 154 is then rotated from position shown in FIG. 3 to the position shown in FIG. 1 whereby the dimples 148 no longer urge the spring arms towards each other, thus the locking clip ends 156,156 penetrate a corresponding set of adjustment holes 140 in outer member 14 and a firm locking together of the inner and outer members 14,16 is achieved with the pointed corners 22 dug deeply into wood structural members 24,24. Pivot clip and locking clip may be rotated in a clockwise direction away from respective dimples 146 and 148 as shown in FIG. 1 until clips 150,154 are disposed within the sidewalls of bracket 12.

A reverse movement of locking clip 154 begins the unlocking process.

FIGS. 6–8 illustrate a further component of system 10 which includes a suspended bracket 48. Bracket 48 is also made of sheet metal having at least one bent side 50 at right angles to the main wall 52. A further bent side 54 also extends from main wall 52. Wall 54, however, terminates in an inturned lip 56. Inturned lip 56 functions to effectively slidably lock suspended bracket 48 to main support bracket 12 as best shown in FIG. 7. This is done by hooking inturned lip 56 over wall 20 and/or 21 of bracket 12. Suspended bracket 48 is then rotated so that its main wall 52 is in line with and disposed flat against intermediate wall 18 of support bracket 12. In order to permit such rotational movement a cut-out 58 is provided in side wall 50. A similar cut-out would also have to be provided on the opposite side of main wall 52 in the event a second perpendicular wall similar to wall 50 were formed at the opposite side of wall 50.

In order to provide versatility to suspended bracket 48 wall 50 is provided with a hole 60 through which a fastener 62 can be inserted for direct securement to one of the wooden frame members. FIG. 9, for example, illustrates the fastener 60 to be mounted into a wooden frame member 24 without the bracket 48 being suspended from main support bracket 12. Any suitable type of fastener may be used to accomplish this mounting. In the illustrated embodiment the fastener 62 has a threaded end with the opposite end being an eye or loop 66. With this arrangement the fastener 62 would be rotated or otherwise manipulated until it is securely fastened into wooden frame member 24. The loop 66 would be disposed flat against wall 52 as shown in FIG. 6. Another set of fastening members would be utilized to lock fastener 62 in place. For example, as shown in FIGS. 6 and 7 a bolt 68 is inserted through a corresponding hole in wall 52 and extends through loop 66. A wing nut 70 is then secured over the free end of bolt 68 to prevent any movement of fastener 62.

Bracket 48 includes various structural features to permit the bracket to function as a support member for components of the installation in the building. As best shown in FIGS. 6 and 9, for example, sets of four slots 74 arranged in pairs are provided at various locations in wall 52. Slots 74 function as a means for threading an end of a strap through one pair in each set of slots by weaving the ends of each strap 76 through a corresponding pair of said slots thereby leaving a loop 78 at the lower suspended portion of the strap 76 as shown in FIGS. 13 and 14 in connection with a different type of bracket. The straps 76 may be made of any suitable high strength material including known plastic material having holes uniformly spaced with which conventional materials are used as nail mounting holes. Such holes, if desired, may be used to permit lacing material to be inserted through the strap holes to further assure that the straps will not be dislodged from slots 74. Such lacing material, however, may not be necessary since the threading of the straps through the four slots 74 should alone be a sufficient manner of mounting. A second strap may also be used for each other set of four slots in bracket 48.

If desired, suspended bracket 48 may also include known bushings 80 in wall 52. Bushings 80 would have stiff, yet resilient flexible fingers 82 so that pipes, tubes, etc. of various diameters may be inserted through the bushings and effectively locked in place. Bushings 80 include a pair of retainer lugs 84 spaced inwardly from flange 86 a distance generally equal to or slightly larger than the thickness of wall 52. Thus the bushings would be mounted to wall 52 by snapping the bushings through corresponding holes in wall 52 until the retainer lugs are opposite the side of flange 86.

FIG. 9 shows in cross-section a pipe 88 for conveying water, gas, etc. to be mounted in a bushing 80. As noted, FIG. 9 also shows the eye-bolt 62 mounted directly to wooden frame member 24 rather than being suspended from main support bracket 12. The mounting could be to a horizontal frame member 24 as shown or to a vertical or inclined support member.

FIGS. 10–12 illustrate a more simplified form of support member 90 which has a main wall 92 through which bushings 80 are secured. Bracket 90 includes a pair of parallel side walls 94,96. Each side wall has a hole 60 similar to the side wall 50 of bracket 48. Thus, fastening elements such as eye-bolt 62, bolt 68 and nut 70 may be utilized to directly mount the bracket 90 to a wooden frame member 24. FIG. 10 shows one of the holes 64 through which the bolt 68 would be secured. Such a hole would also be provided on wall 52 on bracket 48.

If desired one of the walls 94 or 96 may be made similar to wall 54 of bracket 48 so that bracket 90 could also be suspended from main support bracket 12.

FIG. 11 shows in phantom how a larger size pipe 88 could be inserted through the same bushing 80 because of the ability of bushing 80 to accommodate different diameter members.

Although bracket 90 is shown to include only bushings 80, bracket 90 may also include sets of slots 74 in addition to or instead of the bushings 80.

FIGS. 13–16 illustrate a further bracket 98 which could be used in the support system of this invention. As shown therein bracket 98 includes a main wall 100 having at one edge thereof a mounting wall 102 terminating in an inturned lip 104 so that the bracket could be hooked over main support bracket 12 in the same manner previously described with respect to bracket 48. Alternatively, bracket 98 could be mounted directly to a wooden frame member 24 at various locations. For example, a hole 106 is provided in wall 102 so that the wall 102 could be mounted directly against the wooden frame member 24 by means of any suitable fastener 108 as shown in FIG. 16. Other holes, such as holes 110 could be provided for various screw or other fasteners.

Bracket 98 includes at its end opposite wall 102 a pair of inclined edges 112,114 for fitting snugly against an inclined wooden frame member so as, for example, to match the roof pitch where the wooden frame member 24 is a rafter. In order to provide such mounting to the wooden frame member a hole 116 is provided generally at the convergence of the two walls 112,114. (See FIG. 16) An eye-bolt 62 could be mounted into wooden frame member 24 and then locked to bracket 98 by means of bolt 68 and nut 70 as shown in FIG. 13–14.

Bracket 98 is illustrated as having a set of slots 74 for securement of a strap 76. Bracket 98 may be made of larger size and include in addition further sets of slots 74 and/or bushings 80. Alternatively, bracket 98 may be of generally the same size as illustrated and include bushings 80 instead of the slots 74.

FIGS. 13–14 illustrate the use of the strap 76 to mount a vent pipe 118.

FIGS. 17–20 show a modified form of support bracket 12 which includes inner and outer members 14,16 generally similar to the bracket shown in FIGS. 1–2 of parent application Ser. No. 08/917,165, the details of which are incorporated herein by reference thereto. In that embodiment the inner and outer members 14,16 are held together by slide sleeve 30. In addition, holes 34 are provided in the bottom walls of members 14,16 to accommodate lacing material 38. In the embodiment of FIGS. 17–20, however, in addition to the retainer slide sleeve 30 the bracket includes a positioning sleeve 120. Sleeve 120 includes a slot or recess 122 extending inwardly from one edge thereof.

FIG. 20 shows the manner of mounting bracket 12. As shown therein the bracket halves or members 14,16 are pulled apart enough to disengage positioning pin 124. The members 14,16 are slid until the tabs or corner points 22 touch the inside surfaces of the studs or joists 24. Pin 124 is engaged in the nearest hole 34. The members 14,16 in the position shown in solid in FIG. 21 are arranged in a generally V-shape and then pressed into alignment with each other to dig the points 22 into the studs 24 with the pin 124 engaged in aligned holes 34. When the bracket is straightened or has its members 14,16 in alignment, slide retainer sleeve 30 is then moved to overlap both inner and outer members 14,16. The slotted positioning sleeve 120 would be slid until its slot 122 abuts against pin 124. If desired, the inner side of pin 124 may be soldered by soldering material 126 as shown in FIG. 18 to provide a firm connection of the bracket components. The use of the solder material 126 would cover a sufficient area to solder the pin 124 not only to the inner surface of member 14, but also to the positioning sleeve 120. As shown in FIG. 17 lacing material such as nylon line may be threaded through the appropriate holes 34 to support various components such as drain pipe 128 and supply pipe 130 in the manner previously described.

The bracket shown in FIGS. 17–20 is particularly advantageous in that it provides a more user friendly installation as a result of the use of the fixed positioning pin and two sliding clips.

FIGS. 21–23 show an alternative form of suspended bracket which differs from the type of bracket shown in FIG. 6 in that instead of having slots and straps, a plurality of holes 132 is provided at suitable locations through which lacing material 38 may be inserted for mounting components such as pipe 118.

FIGS. 24–26 show yet another form of suspended bracket 134 wherein holes 136 are provided through which lacing 38 may be threaded for mounting various components such as pipe 118.

These variations of FIGS. 17–26 permit the use of lace material in the form, for example, of heavy weed whacker type line which are locked into holes instead of slots. This provides 360° locking ability and allows the positioning of brackets on any angle or structure.

FIGS. 27–31 show a variation of the invention which can be used to secure the system to support members made of materials other than wood, such as to a steel framework. In building construction having steel framework, such as studs, beams, etc., it is necessary to install various systems such as pipe systems, water, gas, pumping appurtenances and other devices. Generally, various brackets are used which are screwed or otherwise fastened to steel framework. These conventional installation systems are disadvantageous in effort and difficulty required for mounting the support members.

In the embodiment shown in FIGS. 27–31 the support system 10, such as previously described and illustrated in FIGS. 1–5 is provided with a mounting bracket 160 at each end thereof. Mounting bracket 160 includes a mounting plate 162 having holes 164. A channel shaped extension or foot 166 is secured to plate 162 disposed toward the ends of each respective channel member 14 and 16. Channel shaped extension 166 has a pair of side walls 168 spaced apart so as to receive the pointed ends 22 and adjacent portions of each channel member 14,16. If desired, the walls 168 of extension 166 may be bent over to form a further wall 169 such as shown in the lower portion of extension 168 for snugly receiving the corresponding wall of member 14,16.

In practice, the plate 162 would be secured to the steel joists or stud 170 as shown in FIGS. 28 and 30 by the use of any suitable fastener such as self-tapping screws 172.

To assemble the system the members 14,16 are inserted into brackets 160 and would be adjusted to generally the proper length so that there is sufficient clearance between the two opposing steel frame pieces 170,170. When the telescoped members 14,16 are positioned between a pair of such steel frame members 170,170 the telescopic members 14,16 could be moved apart to contact the steel frame members with sufficient pressure to be free standing in the steel joists or stud petitions and permanently attached by then securing the screws 172 to the steel structural members 170. Due to the locking telescopic bracket, the outward and inward movement motion is frozen and the bracket stabilizes the somewhat flimsy steel construction. The outward pressure from the expanding nature of the bracket 160 against the steel structure 170 provides a free standing brace in the wall. This temporary immobility of the brace then allows the installer to use both hands to permanently fasten the brace flange or plate 162 to the metal structure with self-tapping screws.

It is to be understood that while each of the brackets is shown as including various structural alternatives, such as slots, bushings, straps and lacing, various aspects of any bracket may be incorporated with other brackets within the spirit of this invention. Thus, for example, each bracket may include any number of sets of slots, holes and/or bushings.

What is claimed is:

1. A support system for wood framed construction, said support system including a main support bracket, said main support bracket comprising a first elongated member of channel shape telescoped into a second elongated member of channel shape, a locking unit for securing said first member and said second member together, each of said first member and said second member terminating in a pointed free end for piercing a wooden frame member, said second elongated member having a plurality of sets of aligned adjusting holes extending therethrough, said first elongated member having two sets of aligned holes alignable with said sets of adjusting holes, one of said sets of aligned holes in said first member being pivot holes and the other of said sets of aligned holes in said first member being locking holes, said locking unit comprising a locking clip engageable in one of said set of pivot holes and said set of locking holes in said first member and in an aligned set of said adjusting holes in said second member, and said locking clip being a generally U-shaped spring clip having resilient arms with outwardly extending ends, said outwardly extending ends being generally aligned with each other to comprise pins insertable in said holes of said first member and in an aligned set of said adjusting holes of said second member.

2. The system of claim 1 wherein said locking clip is a first locking clip engageable in said pivot holes of said first member, and said locking unit further comprising a second locking clip engageable in said locking holes of said first member and in a further aligned set of said adjusting holes in said second member.

3. The system of claim 2 including a set of inwardly extending projections on said first member adjacent to each of said sets of pivot holes and locking holes for causing said arms of said clips to move toward each other upon contact by said projections.

4. The system of claim 1 including a set of inwardly extending projections on said first member adjacent to each of said sets of pivot holes and locking holes for causing said arms of said clip to move toward each other upon contact by said projections.

5. The system of claim 1 including lacing for being inserted through said mounting holes for anchoring an installation component to said main support bracket.

6. The system of claim 1 including a suspended bracket mounted to and suspended from said main support bracket, said suspended bracket having component mounting elements, and said component mounting elements including at least one set of four slots arranged in pairs and a strap threaded through said slots.

7. The system of claim 6 wherein said component mounting elements further include at least one bushing having resilient fingers through which a component may be mounted.

8. The system of claim 6 wherein said strap has its free ends threaded through said slots with a loop formed in a central portion of said strap.

9. The system of claim 1 including a suspended bracket mounted to and suspended from said main support bracket, said suspended bracket having component mounting elements, and said component mounting elements further including at least one bushing having resilient fingers through which a component may be mounted.

10. The system of claim 1 including a suspended bracket mounted to and suspended from said main support bracket, said suspended bracket having component mounting elements, said suspended bracket including a flange along one edge thereof, said flange terminating in an inturned lip, and said inturned lip being mounted over said main support bracket.

11. The system of claim 1 including a suspended bracket mounted to and suspended from said main support bracket, said suspended bracket having component mounting elements, and said suspended bracket including fasteners for being mounted directly to a wooden support member.

12. The system of claim 11 including a plurality of said component mounting elements on said suspended bracket.

13. The system of claim 12 wherein said plurality of component mounting elements includes a plurality of sets of slots, and at least one strap for being threaded through one of said sets of slots.

14. The system of claim 13 wherein said plurality of components mounting elements further includes a plurality of bushings having resilient fingers.

15. The system of claim 1 including a plurality of said suspended brackets each of which is mounted to and suspended from said main support bracket.

16. The system of claim 1 wherein each of said pointed ends comprises a pair of pointed corners.

17. The system of claim 1 including a suspended bracket mounted to and suspended from said main support bracket, said suspended bracket having component mounting elements, and said bracket being made of sheet metal.

18. A support system for wood framed construction, said support system including a main support bracket, said main support bracket comprising a first elongated member of channel shape telescoped into a second elongated member of channel shape, a locking unit for securing said first member and said second member together, each of said first member and said second member terminating in a pointed free end for piercing a wooden frame member, said second elongated member having a plurality of sets of aligned adjusting holes extending therethrough, said first elongated member having two sets of aligned holes alignable with said sets of adjusting holes, one of said sets of aligned holes in said first member being pivot holes and the other of said sets of aligned holes in said first member being locking holes, said locking unit comprising a locking member engageable in said set of locking holes in said first member and in an aligned set of said adjusting holes in said second member, said unit further including a pivot member having outwardly extending ends which comprise pivot pins insertable in said set of pivot holes of said first member and in an aligned set of said adjusting holes of said second member, including a suspended bracket, said a fastener on said main wall located at generally the apex of said V-shape.

19. The system of claim 18 including fastener holes in said main wall and in said one side.

20. A support system for wood framed construction, said support system including a main support bracket, said main support bracket comprising a first elongated member of channel shape telescoped into a second elongated member of channel shape, a locking unit for securing said first member and said second member together, each of said first member and said second member terminating in a pointed free end for piercing a wooden frame member, said second elongated member having a plurality of sets of aligned adjusting holes extending therethrough, said first elongated member having two sets of aligned holes alignable with said sets of adjusting holes, one of said sets of aligned holes in said first member being pivot holes and the other of said sets of aligned holes in said first member being locking holes, said locking unit comprising a locking member engageable in said set of locking holes in said first member and in an aligned set of said adjusting holes in said second member, said unit further including a pivot member having outwardly extending ends which comprise pivot pins insertable in said set of pivot holes of said first member and in an aligned set of said adjusting holes of said second member, including a suspended bracket, said suspended bracket having component mounting elements, said suspended bracket including a main wall having said component mounting elements therein, a first side wall connected to said main wall and bent generally perpendicular to said main wall, said first side wall having fastener structure to permit said bracket to be mounted directly to a wooden frame member, a second side wall disposed generally perpendicular to said first side wall, said second side wall being bent perpendicular to said main wall and terminating in an inturned lip for being hooked over said main support bracket, and a cut-out in said first side wall adjacent to said second wall to permit said suspension bracket to be hooked over said main bracket and rotated into contact with said main bracket.

21. A support system for wood framed construction, said support system including a main support bracket, said main support bracket comprising a first elongated member of channel shape telescoped into a second elongated member of channel shape, a locking unit for securing said first member and said second member together, each of said first member and said second member terminating in a pointed free end for piercing a wooden frame member, said second elongated member having a plurality of sets of aligned adjusting holes extending therethrough, said first elongated member having two sets of aligned holes alignable with said sets of adjusting holes, one of said sets of aligned holes in said first member being pivot holes and the other of said sets of aligned holes in said first member being locking holes, said locking unit comprising a locking member engageable in said set of locking holes in said first member and in an aligned set of said adjusting holes in said second member, said unit further including a pivot member having outwardly extending ends which comprise pivot pins insertable in said set of pivot holes of said first member and in an aligned set of said adjusting holes of said second member, including a mounting bracket for adapting said system for being mounted to a non-wooden frame member, said mounting bracket comprising a plate, an extension secured to said plate, and said pointed free end of one of said elongated members being telescoped into said extension.

22. The system of claim 21 wherein said extension is channel-shaped.

23. The system of claim 22 including a second mounting bracket, and each of said elongated members being telescoped into a respective one of said mounting brackets.

24. A support system for wood framed construction, said support system including a main support brackets, said main support bracket comprising a first elongated member of channel shape telescoped into a second elongated member of channel shape, a locking unit comprising a positioning pin and positioning sleeve for securing said first member and said second member together, each of said first member and said second member terminating in a pointed free end for piercing a wooden frame member, each of said elongated members having a plurality of mounting holes extending therethrough, said positioning pin extending through an aligned pair of said mounting holes in said elongated members for maintaining said elongated members together while said elongated members are moved from an angled non-telescopic position to an aligned telescopic position to pierce said pointed free ends into the wooden frame members, and said positioning sleeve being slidable into contact with said positioning pin when said elongated members are in said aligned telescopic position for locking said positioning pin in place.

25. The system of claim 24 including a retainer sleeve mounted over said elongated members spaced from said positioning sleeve for mounting said elongated members together.

26. The system of claim 24 wherein said positioning sleeve includes a slot, and said positioning pin being in said slot when said elongated members are in said aligned telescopic position.

27. A method of mounting a support bracket to spaced wooden frame members, including the steps of providing the support bracket in the form of first and second elongated channel shaped members terminating in pointed free ends disposing the channel shape members at an angle to each other to form a bracket assembly, inserting the bracket assembly between the wooden frame members with the pointed end of each elongated member disposed against a respective wooden frame member, inserting a pivot clip into the first elongated member with the pivot clip having outwardly extending pivot arms which extend through pivot holes in the first member and aligned holes in the second member, moving the elongated members into alignment with each other to thereby cause the pointed ends to pierce into the wooden frame members, inserting a U-shaped locking clip into the first member with the locking clip having spring arms terminating in outwardly extending ends which extend through a set of locking holes in the first member and a further aligned set of holes in the second member, wherein the first member has inwardly directed dimples adjacent each set of pivot holes and locking holes, and moving the arms of the pivot clip and locking clip closer together by the arms contacting the respective dimples so as to disengage the outwardly extending ends of the clips from the holes in the second member.

* * * * *